(12) United States Patent
Nakane (10) Patent No.: US 10,997,480 B2
(45) Date of Patent: May 4, 2021

(54) IMAGE FORMING APPARATUS AND CONTROL METHOD FOR IMAGE FORMING APPARATUS

(71) Applicant: CANON KABUSHIKI KAISHA, Tokyo (JP)

(72) Inventor: Hiroyuki Nakane, Kashiwa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/741,519

(22) Filed: Jan. 13, 2020

(65) Prior Publication Data

US 2020/0234095 A1    Jul. 23, 2020

(30) Foreign Application Priority Data

Jan. 18, 2019  (JP) .............................. JP2019-007006

(51) Int. Cl.
*G06K 15/00*  (2006.01)
*G06F 3/12*  (2006.01)

(52) U.S. Cl.
CPC ....... *G06K 15/4075* (2013.01); *G06K 15/005* (2013.01); *G06K 15/4065* (2013.01)

(58) Field of Classification Search
None
See application file for complete search history.

(56) References Cited

U.S. PATENT DOCUMENTS

| 5,802,420 A * | 9/1998 | Garr ..................... B41J 2/17566 |
| | | 399/27 |
| 2012/0081728 A1* | 4/2012 | Yamazaki .......... H04N 1/32374 |
| | | 358/1.13 |
| 2016/0292772 A1* | 10/2016 | Nagasaki ........... G06K 15/4075 |
| 2018/0240022 A1* | 8/2018 | Channa ................. G06F 3/1203 |
| 2020/0371509 A1* | 11/2020 | Mark .................. G05B 19/4183 |

FOREIGN PATENT DOCUMENTS

JP         3-161765 A    7/1991

\* cited by examiner

*Primary Examiner* — Dov Popovici
(74) *Attorney, Agent, or Firm* — Canon U.S.A., Inc., IP Division

(57) ABSTRACT

An apparatus and method for detecting replacement of a consumable to be used for image formation is provided. The replacement detection mechanism, in response to detecting replacement of the consumable is needed, counter data including a number of printed sheets using the consumable is initialized, without initialization of learning data for determining a remaining use period from a use amount in a predetermined period of the consumable.

17 Claims, 12 Drawing Sheets

< INIT >   COUNTER

| | | | NUMBER OF REMAINING DAYS |
|---|---|---|---|
| 701 | TR-ROLL | 5% | 999 |
| 702 | C1-PU-RL | 5% | 999 |
| 703 | C2-PU-RL | 5% | 100 |
| 704 | C3-PU-RL | 5% | 21 |
| 705 | C4-PU-RL | 8% | 999 |

PREV  1/5  NEXT

FIG.7B

< INIT >   COUNTER

| PARTS | | | NUMBER OF REMAINING DAYS |
|---|---|---|---|
| 701 | TR-ROLL | 5% | 999 |

DO YOU WANT TO EXECUTE INITIALIZATION PROCESSING?

CANCEL   EXECUTE

| | PARTS COUNTER DATA | ~1100 | | |
|---|---|---|---|---|
| ID | NAME | SIZE (byte) | VALUE | |
| 1 | PRINT SHEET COUNTER | 4 | 300 | ~1101 |
| 2 | NUMBER OF SHEETS OF LIFESPAN | 4 | 100000 | ~1102 |
| 3 | REPLACEMENT DATE | 4 | 2018/1/1 | ~1103 |
| 4 | TOTAL COUNTER IN REPLACEMENT | 4 | 5000 | ~1104 |
| 5 | PRINT SHEET COUNTER IN PREVIOUS REPLACEMENT | 4 | 4000 | ~1105 |
| 6 | NUMBER OF REPLACEMENTS | 2 | 1 | ~1106 |
| 7 | DETAIL COUNTER | 2 | 2 | ~1107 |

FIG.11B

| | LEARNING DATA (2018/3/22) | ~1110 | | |
|---|---|---|---|---|
| ID | NAME | SIZE | VALUE | |
| 1 | NUMBER OF REMAINING DAYS | 4 | 48 | ~1111 |
| 2 | NUMBER OF REMAINING DAYS max | 4 | 105 | ~1112 |
| 3 | NUMBER OF REMAINING DAYS min | 4 | 48 | ~1113 |
| 4 | DATE AND TIME OF PREVIOUS COMPUTATION | 4 | 2018/3/12 | ~1114 |
| 5 | AVERAGE OF CONSUMPTION IN PREDETERMINED PERIOD | 4 | 7.1 g | ~1115 |
| 6 | STANDARD DEVIATION OF CONSUMPTION IN PREDETERMINED PERIOD | 4 | 4.4 g | ~1116 |
| 7 | REMAINING AMOUNT PREDICTION ERROR | 4 | 5 g | ~1117 |
| 8 | DELAYED-DELIVERY OCCURRENCE PROBABILITY INFORMATION | 2 | 5 | ~1118 |

FIG.12

IMAGE FORMING APPARATUS AND CONTROL METHOD FOR IMAGE FORMING APPARATUS

BACKGROUND

Field

The present disclosure relates to an image forming apparatus and a control method for an image forming apparatus.

Description of the Related Art

An image forming apparatus such as a printer, a copier, or a facsimile includes a plurality of consumable parts (hereinafter referred to as the consumables) in a replaceable manner. The consumables are consumed as the image forming apparatus operates. Examples of the consumables include a toner container and a collected toner container.

Each of those consumables deteriorates over time, breaks down, or eventually becomes unusable by using up a consumption material in a container. A general user (hereinafter referred to as the user) or a service engineer in charge of management and maintenance for keeping normal operation of the image forming apparatus replaces the consumables. For example, in a case where a new consumable is attached in replacement, a system in the image forming apparatus that has detected a new part automatically initializes or a person who carries out the replacement manually initializes consumables-consumption information stored in a memory, in order to update this consumption information (initialization processing in Japanese Patent Application Laid-Open No. H3-161765).

The use state of a consumable is not constant and changes from day to day and thus, it is difficult to accurately predict the number of days (a remaining period) before a remaining amount becomes zero. Therefore, in a related technology, daily consumption information about a consumable (e.g., a toner consumption amount) of a user is stored in a memory of the consumable itself or in a memory of an image forming apparatus, and a feature amount of the way the image forming apparatus is used by the user is extracted from the consumption information.

Even for such a case, i.e., the case where the consumption information includes the feature amount representing the way the image forming apparatus is daily used by the user, the initialization processing in Japanese Patent Application Laid-Open No. 3-161765 is performed. In other words, this initialization processing is performed for the consumption information, regardless of the presence or absence of the feature amount. Therefore, the feature amount of the way the image forming apparatus is used by the user is lost, so that a lifespan cannot be correctly predicted based on consumable history information corresponding to the way the image forming apparatus is used before consumable replacement.

SUMMARY

According to an aspect of the present disclosure, an image forming apparatus includes a detection unit configured to detect a consumable to be used for image formation in the image forming apparatus needs to be replaced, and an initialization unit configured to initialize counter data including a number of printed sheets using the consumable in response to the replacement of the consumable detected by the detection unit, the initialization of counter data occurring without initializing learning data for determining a remaining use period from a use amount in a predetermined period of the consumable.

Further features of the present disclosure will become apparent from the following description of exemplary embodiments with reference to the attached drawings.

DESCRIPTION OF THE EMBODIMENTS

An exemplary embodiment of the present disclosure will be described below with reference to the drawings.

Figure 1:
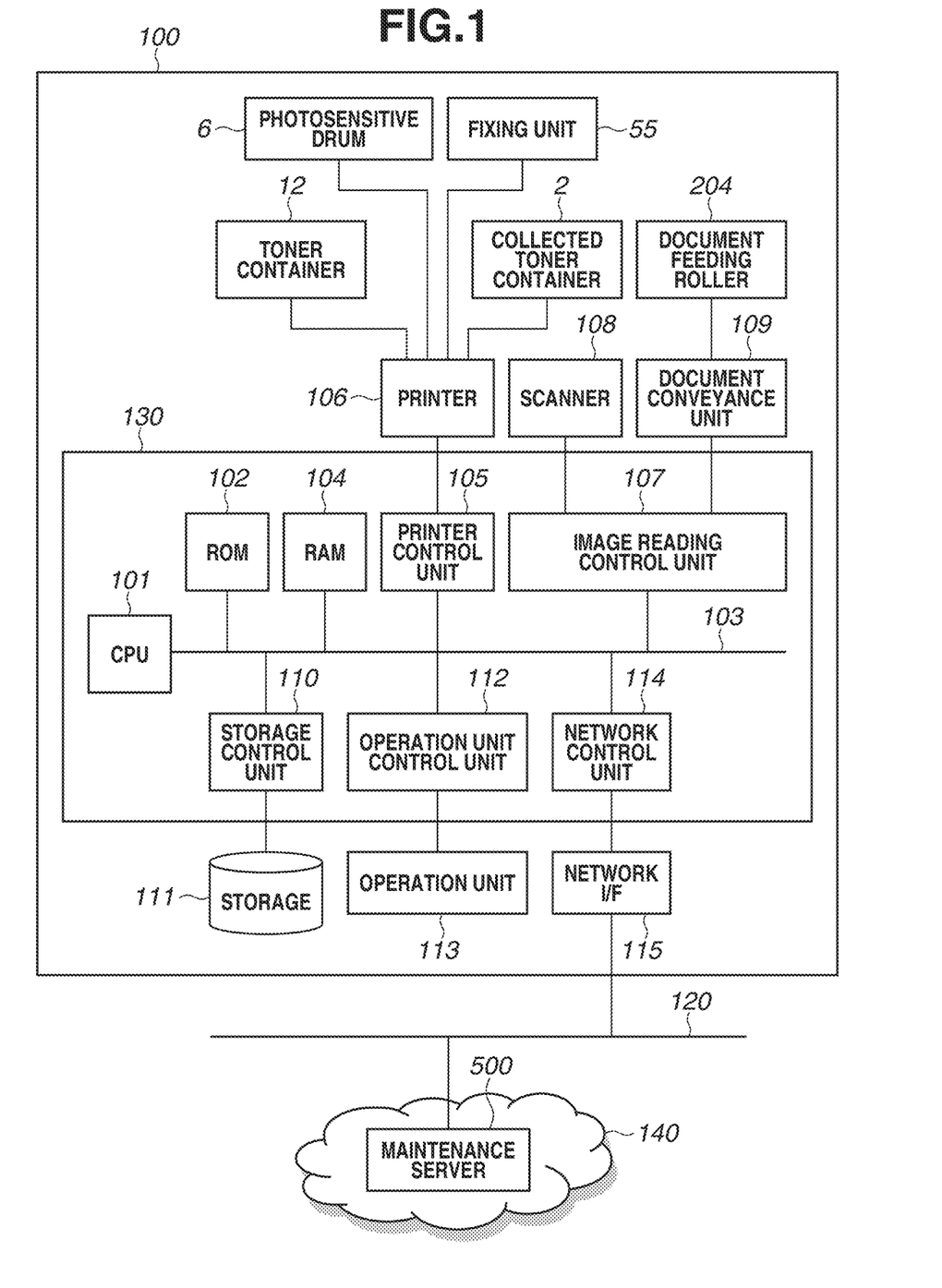
FIG. 1 is a block diagram illustrating an example of a hardware configuration of an image forming apparatus.

FIG. 1 is a block diagram illustrating an example of a hardware configuration of an image forming apparatus 100 in the present exemplary embodiment.

The image forming apparatus 100 includes a controller 130 that includes a central processing unit (CPU) 101.

The controller 130 further includes a read only memory (ROM) 102, a random access memory (RAM) 104, a printer control unit 105, an image reading control unit 107, a storage control unit 110, and an operation unit control unit 112.

All components of the controller 130 are connected by a bus 103. The image forming apparatus 100 further includes pieces of hardware such as a storage 111, a printer 106, a scanner 108, a document conveyance unit 109, and an operation unit 113.

The printer control unit 105, the image reading control unit 107, the storage control unit 110, and the operation unit control unit 112 of the controller 130 each serve as an interface for the CPU 101 to control the corresponding piece of hardware.

In the image forming apparatus 100, many consumables are configured to be replaceable by a user or a service engineer. For example, in the printer 106, a toner container 12 and a collected toner container 2 are replaceable consumables, and are configured to be detachable from the printer 106. A state where a remaining amount of toner in the toner container 12 becomes a threshold or less is referred to as the consumption of the toner container 12, while a state where an amount of toner not used for printing and contained in the collected toner container 2 is a threshold or more is referred to as the consumption of the collected toner container 2. Parts with a low degree of consumption, such as a photosensitive drum 6 and a fixing unit 55, may not be treated as consumables, and may be thereby excluded from targets for notification of the number of remaining days.

The printer 106 performs image formation using an electrophotographic method that fixes toner on a sheet to print an image based on bitmap data generated by the controller 130. The printer 106 may adopt an inkjet method that discharges ink onto a sheet to print an image. A recording material in the electrophotographic method is toner, and a recording material in the inkjet method is ink.

The document conveyance unit 109 includes a document feeding roller 204. In the present exemplary embodiment, the consumables will be described as consumables replaceable by the user but are not limited thereto. Some of the consumables may be consumables to be replaced by the service engineer.

The controller 130 including the CPU 101 controls the entire image forming apparatus 100.

The CPU 101 starts an operating system (OS) based on a boot program stored in the ROM 102. Further, the CPU 101 executes a control program stored in the storage 111 or the ROM 102, on the OS. The RAM 104 is used as a main memory and a temporary storage area such as a work area of the CPU 101. The storage 111 is a readable writable nonvolatile storage device such as a hard disk drive (HDD). The storage 111 stores a program for controlling the entire image forming apparatus 100, various application programs, image data, and the parts counter data (daily consumption information about a consumable of the user) to be described below of each consumable. The storage 111 also stores various data such as learning data (the number of remaining days and a feature amount of the usage of the user that are intended to predict the number of remaining days) and programs.

The CPU 101 accesses the storage 111 via the storage control unit 110.

The CPU 101 controls the image forming apparatus 100 by executing a control program or an application program read out from the storage 111 or the ROM 102 and loaded into the RAM 104.

In the image forming apparatus 100 of the present exemplary embodiment, the one CPU 101 executes each step of processing in a flowchart to be described below, using a program loaded into the one memory (the RAM 104), but other form may be adopted. For example, a plurality of processors, RAMs, ROMs, and storages can execute each step of the processing in the flowchart to be described below, by operating together.

The learning data will be described as data stored in the RAM 104 or the storage 111. However, for example, the learning data may be stored in a memory (not illustrated) included in a device such as the printer 106 or the scanner 108, and controlled by a CPU for printer control or for scanner control.

Further, part of the processing may be executed by using a hardware circuit such as an application-specific integrated circuit (ASIC) or a field-programmable gate array (FPGA).

The CPU 101 controls the scanner 108 via the image reading control unit 107 to read an image on a document and generate image data based on the read image. The CPU 101 also controls the document conveyance unit 109 having an auto document feeder (ADF), so that the document conveyance unit 109 including a document tray conveys documents on the document tray one by one to the scanner 108, and the scanner 108 generates image data based on the document.

The scanner 108 scans a document using an optical reading device such as a charge-coupled device (CCD), and converts image information of the document into electrical signal data. Image data obtained by reading an image on the document is stored into the storage 111, and used for processing such as print processing.

The operation unit control unit 112 connects the operation unit 113 and the controller 130. The operation unit 113 serves as a display unit that displays information for the user and a receiving unit that receives an instruction from the user. The operation unit 113 displays an operation screen to be described below, and includes a touch panel display that receives an input from the user. The operation unit 113 further includes hardware keys such as a start key, and a status-confirmation/stop key for shifting to a status screen for confirmation of a status of the image forming apparatus 100 or stopping a job.

A network control unit 114 connects a network interface (I/F) 115 and a wired local area network (LAN) 120 via a LAN cable. A maintenance server 500 on the Internet 140 is connected to the wired LAN 120 via a LAN cable. The network I/F 115 can communicate with the maintenance server 500 on the wired LAN 120.

Figure 2:
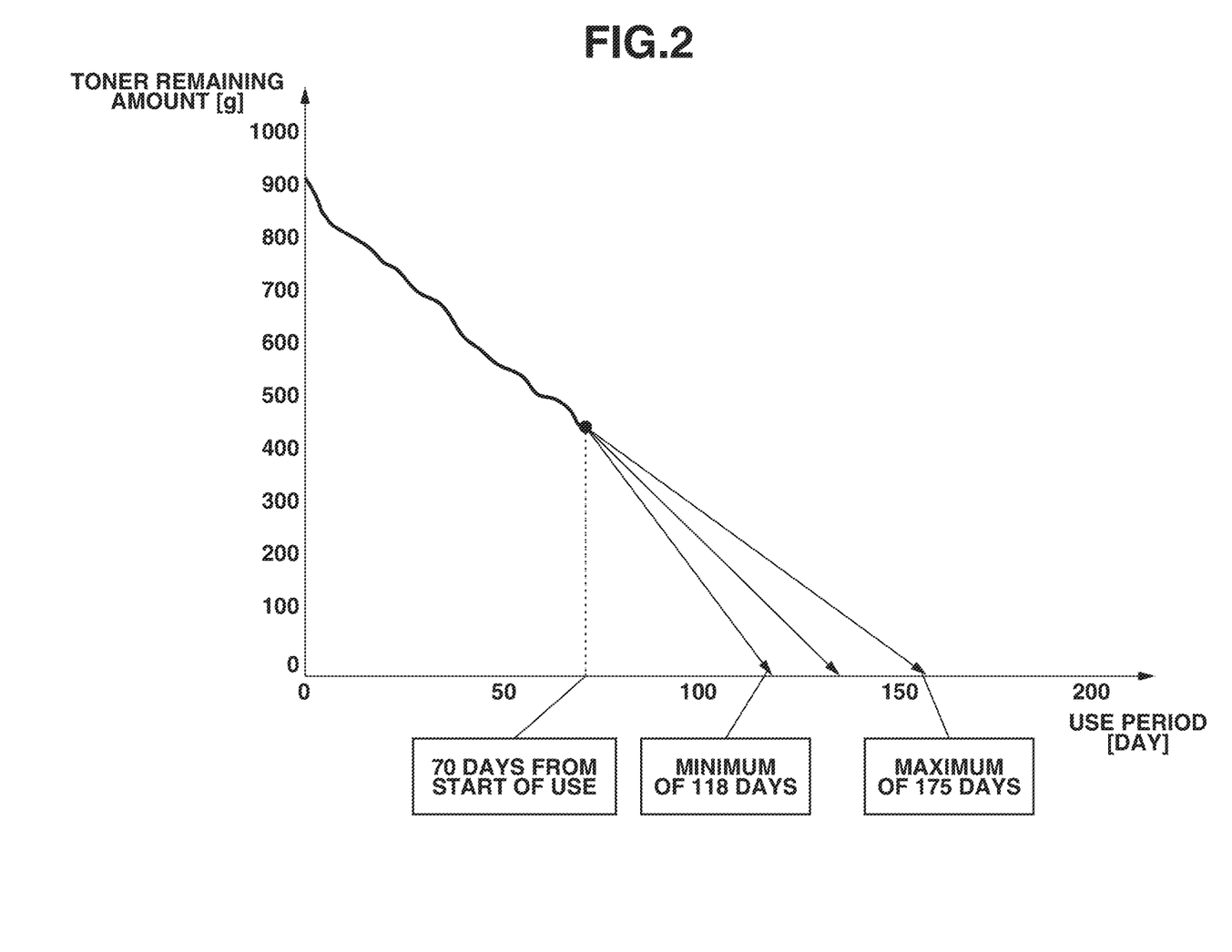
FIG. 2 is a diagram illustrating calculation of the number of remaining days of a consumable.

FIG. 2 illustrates an example of a remaining amount of toner contained in one toner container within a past predefined period. A horizontal axis indicates the number of elapsed days from a use start date, and a vertical axis indicates the remaining amount of the toner contained in the toner container. FIG. 2 illustrates how the remaining amount of the toner changes on a daily basis, by subtracting an amount of used toner per day from the initial amount of the toner (0 day). In this example, the day when the container becomes empty of the toner (i.e., the day when the remaining amount becomes 0) is predicted at the point in time when 70 days have elapsed from the start of the use of the toner as new toner.

The remaining amount is calculated from an average use amount per day of the past 30 days starting from the point in time when 70 days have elapsed from the start of the use of the new toner. In this example, the result of the calculation indicates that the toner runs out in a minimum of 48 days (118 days from the start of the use) and in a maximum of 105 days (175 days from the start of the use).

In this example, the accuracy of the value of the average use amount per day is determined to be low at the start of the use of the new toner, and estimation from the point in time when 70 days have elapsed is made. However, when to start the estimation may be freely set. Further, the estimation may be started after a learning period is defined by a post learning-reset counter to be described below. A consumable may cause stopping of the image forming apparatus when the consumable runs out. Therefore, the minimum day is adopted for such a part to avoid stopping of the image forming apparatus.

The estimation may be executed regularly (e.g., once every second), or may be executed irregularly (e.g., each time image formation is performed by unit of printing such as one image or one page).

For a user whose usage habit changes from day to day, the day when the toner remaining amount becomes zero is updated by successively performing a calculation taking into account the feature of the usage, so that the prediction is accurately performed. A calculation method that enables such a prediction is adopted.

In the present exemplary embodiment, the parts counter data, the learning data, and the toner container will be described.

The parts counter data includes a print sheet counter indicating an accumulated number of passed sheets for a single consumable, the number of sheets of lifespan, a replacement date, a total counter in replacement in the image forming apparatus, a print sheet counter in the previous replacement, and the number of replacements, as items common to each consumable. Further, each component holds other information as a detail counter. For example, in the case of the toner container, a serial identification (ID) and a toner replenishment amount between bottle replacement times are held as the detail counter, and information indicating a consumption state of the toner container at that time, such as information about an amount of remaining toner, is recorded. In a case where the toner container is unused at the time of replacement, information about the weight of the toner filling the toner container at the time of manufacture is recorded.

Figure 11A:
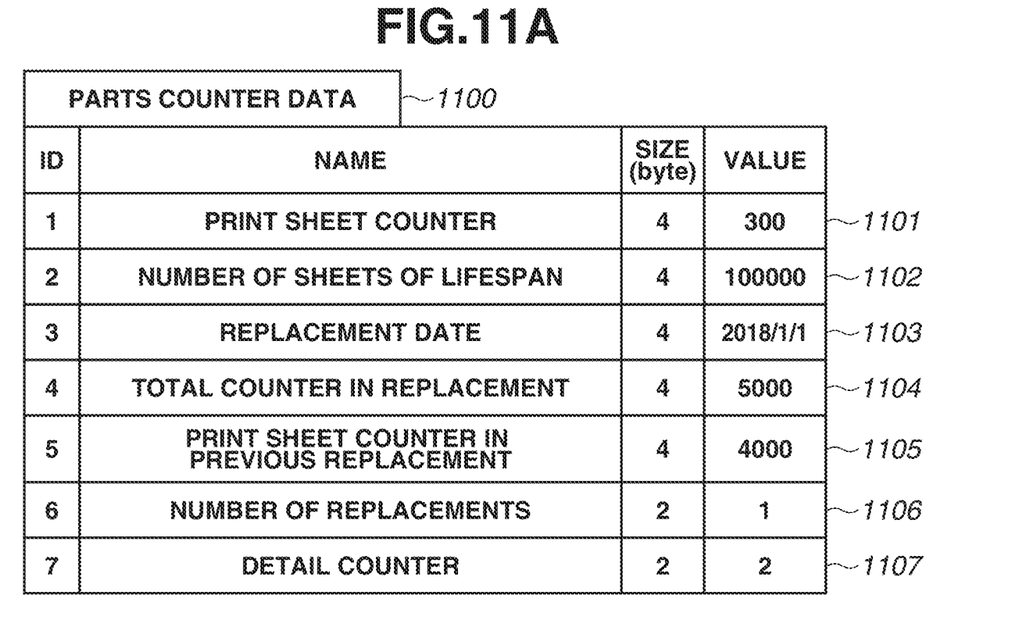
FIG. 11A is a diagram illustrating an example of a structure of parts counter data.

FIG. 11A is a diagram illustrating parts counter data 1100 of the toner container, as an example of the parts counter data of the image forming apparatus 100 at certain timing of calculating the number of remaining days. In the example in FIG. 11A, an item 1101 representing the print sheet counter indicates 300 sheets. This means that 300 sheets have been printed for the toner container 12 of the image forming apparatus 100, since replacement with the current toner container. The unit of 300 sheets may not be a sheet. One sheet of A4 paper may be counted as one unit, or one sheet of A3 paper may be counted as two units. An item 1102 representing the number of sheets of lifespan indicates a predefined number of sheets of lifespan of the currently attached toner container. In this example, replacement at the timing when the number of sheets exceeds one million is recommended. An item 1103 representing the replacement date indicates the date of replacement with the current toner container. In this example, the item 1103 indicates that the replacement has taken place on Jan. 1, 2018. An item 1104 representing the total counter in replacement indicates the total number of printed sheets of the image forming apparatus 100. In this example, 5000 sheets have been printed. The method of counting the number of printed sheets of the image forming apparatus 100 and the unit of the print sheet counter of the parts counter data do not necessarily match with each other. The number of printed sheets of the image forming apparatus 100 is the number of output sheets as viewed from the user. However, as described above, the print sheet counter is defined by the best unit in terms of the prediction of the lifespan of a part. An item 1105 representing the print sheet counter in the previous replacement indicates the value of the item 1101 of the toner container attached before being replaced with the currently attached toner container. In this example, the toner container attached previously was replaced when 4000 sheets were printed. An item 1106 representing the number of replacements indicates the number of times the toner container has been replaced in the image forming apparatus 100. In this example, the toner container is replaced once and therefore, the currently attached toner container is the second part (after the first replacement). An item 1107 representing the detail counter indicates data held in each part, and this data is not directly involved in the prediction of the lifespan and thus will not be described.

The learning data is information to be updated each time computation is performed to predict the number of remaining days that is necessary to determine a remaining use period of a consumable from the parts counter data. The learning data includes the number of remaining days before the end of a consumable lifespan at the time, a date and time of the previous computation, an average of a used-toner amount in a past predetermined period, a standard deviation of a used-toner amount in a past predetermined period, a remaining amount prediction error, and delayed-delivery occurrence probability information.

Figure 11B:
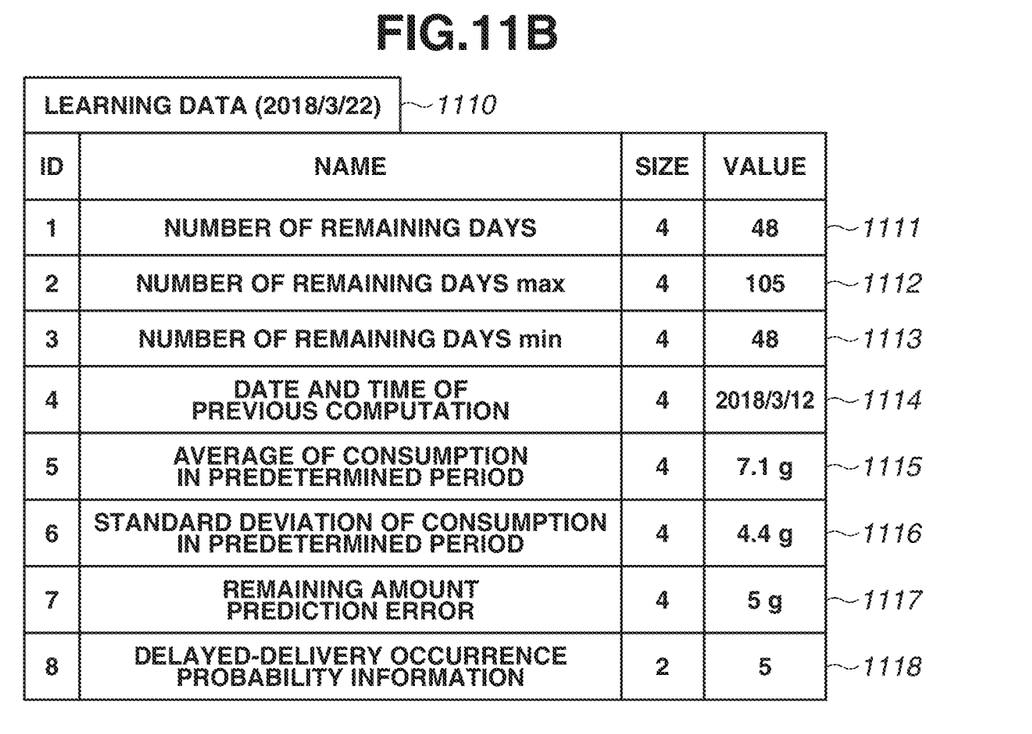
FIG. 11B is a diagram illustrating an example of a structure of learning data.

FIG. 11B is a diagram illustrating learning data 1110 of the toner container, as an example of the learning data of the image forming apparatus 100 in a case where the number of remaining days is calculated on Mar. 22, 2018. An item 1111 representing the number of remaining days indicates the number of remaining days before the end of the lifespan of the toner container 12. The value of this item is updated to a new value after the number of remaining days is calculated from the parts counter data 1100. In the present exemplary embodiment, the minimum number of remaining days to be described below, which is 48 days, is used as the number of remaining days of the toner container 12. However, the maximum number of remaining days or a median value may be defined as the number of remaining days, and can be changed in the setting of the image forming apparatus 100. An item 1112 representing the number of remaining days max and an item 1113 representing the number of remaining days min indicate the maximum number of remaining days and the minimum number of remaining days, respectively, before the end of the lifespan of the toner container 12, as described with reference to FIG. 2. Each of these values is also updated to a new value after the number of remaining days is calculated. An item 1114 representing the date and time of the previous computation holds the date and time when the previous computation is performed and indicates Mar. 12, 2018 (70 days from the start of use). Here, the date and time of the previous computation is described on a date basis for the sake of the description. However, the item 1114 serves similarly even if information indicating the time is further added. An item 1115 representing the average of consumption in the predetermined period indicates an average of consumption calculated based on the information of the parts counter data 1100 in a period from the time of the previous calculation to the current time. For example, in a case where the predetermined period is 30 days, the average of consumption in a period from Feb. 20, 2018 to Mar. 22, 2018 is calculated and the value is updated to the calculated average amount. An item 1116 representing the standard deviation of consumption in the predetermined period indicates a standard deviation of consumption calculated based on the information of the parts counter data 1100 in a period from the time of the previous calculation data to the current time. In a case where the predetermined period is 30 days, the standard deviation of the consumption in the period from Feb. 20, 2018 to Mar. 22, 2018 is calculated and the value is updated to the calculated standard deviation. An item 1117 representing the remaining amount prediction error is a fixed value predefined for each consumable based on an experiment. An item 1118 representing the delayed-delivery occurrence probability information is a variable with which a permissible delayed-delivery occurrence probability can be freely set. In learning, the remaining amount prediction error and the delayed-delivery occurrence probability information are also necessary as coefficients for calculating the number of remaining days. These deviate from the definition of the learning data to be updated each time the computation is performed to predict the number of remaining days, but are handled as the learning data because these use the variables set in the image forming apparatus at the time of the calculation.

In a case where there is a large difference between the number of remaining days calculated previous time and the number of remaining days calculated this time, e.g., in a case where a large amount of toner has been consumed, the image forming apparatus 100 calculates the number of remaining days based on such consumption. Further, the image forming apparatus 100 prevents delayed delivery by prompting the user to have the stock of this consumable by using a stock recommendation alarm. Whether this difference continues intermittently or temporarily cannot be determined by the image forming apparatus 100 and therefore, the stock recommendation alarm cannot be deleted from the image forming apparatus 100.

Further, in the present exemplary embodiment, the example in which the parts counter data and the learning data are stored in the RAM 104 or the storage 111 is described. However, the parts counter data and the learning data can also be stored in a storage device implemented in the consumable, depending on the consumable. In that case, even when the consumable is removed from the image forming apparatus 100, it is possible to refer to the remaining amount and the number of remaining days by attaching the consumable again.

In a first exemplary embodiment, automatic initialization processing triggered by consumable replacement will be described. This is an example of a case where the image forming apparatus 100 executes the initialization processing without the intervention of the user, in response to detection of a consumable in consumable replacement.

Operation for the automatic initialization processing in consumable replacement in the image forming apparatus 100 will be described with reference to a flowchart in FIG. 3. The consumable that can be processed by the automatic initialization processing is a consumable of which detection of whether the consumable has been replaced is detectable without an instruction from the user via the operation unit 113 or from an external apparatus (not illustrated) that can communicate via the wired LAN 120. It is necessary to perform manual initialization for a consumable that is not automatically detectable, and such initialization will be described below in a second exemplary embodiment.

Figure 3:
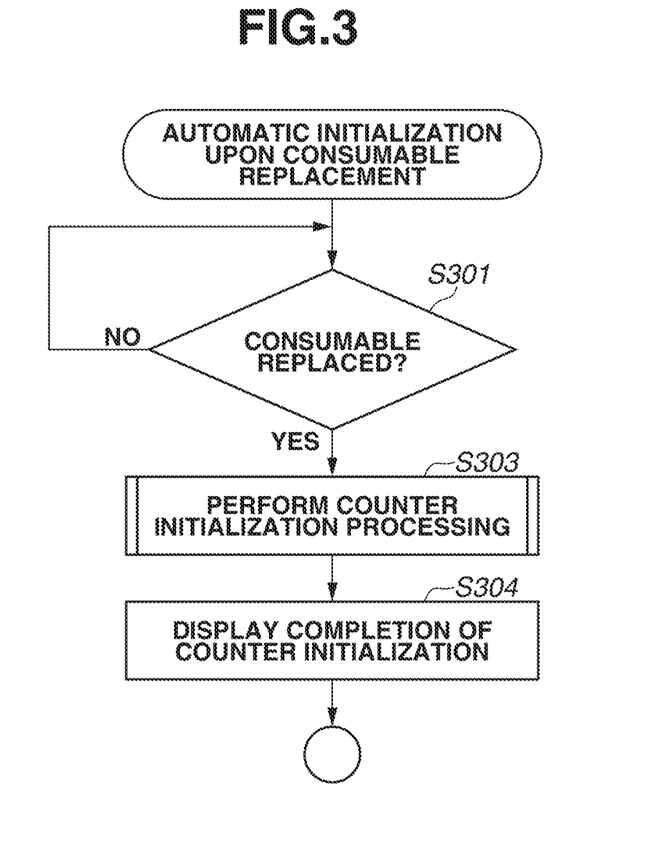
FIG. 3 is a flowchart illustrating automatic initialization in consumable replacement according to a first exemplary embodiment.

The CPU 101 in the controller 130 reads out a program for implementing each control module stored in the ROM 102 or the storage 111 into the RAM 104 and executes the read-out program, so that each operation (step) illustrated in the flowchart in FIG. 3 is implemented. In the present exemplary embodiment, an example in which the controller 130 directly controls each consumable will be described. However, for example, the printer 106 and the scanner 108 may also communicate with the controller 130, as a printer controller and a scanner controller each having a configuration including a CPU, a ROM, and a RAM likewise. In the present exemplary embodiment, the consumable to be replaced will be described as the toner container 12.

In step S301, the controller 130 detects whether the toner container 12 has been replaced, using a sensor (not illustrated) provided in the printer 106. The printer 106 repeats the detection until the toner container 12 is replaced. If the replacement is detected (YES in step S301), the processing proceeds to step S303. In step S303, the controller 130 performs the initialization processing for the parts counter data of the replaced toner container 12 (counter initialization processing). This will be described in detail with reference to a flowchart in FIG. 4.

Figure 4:
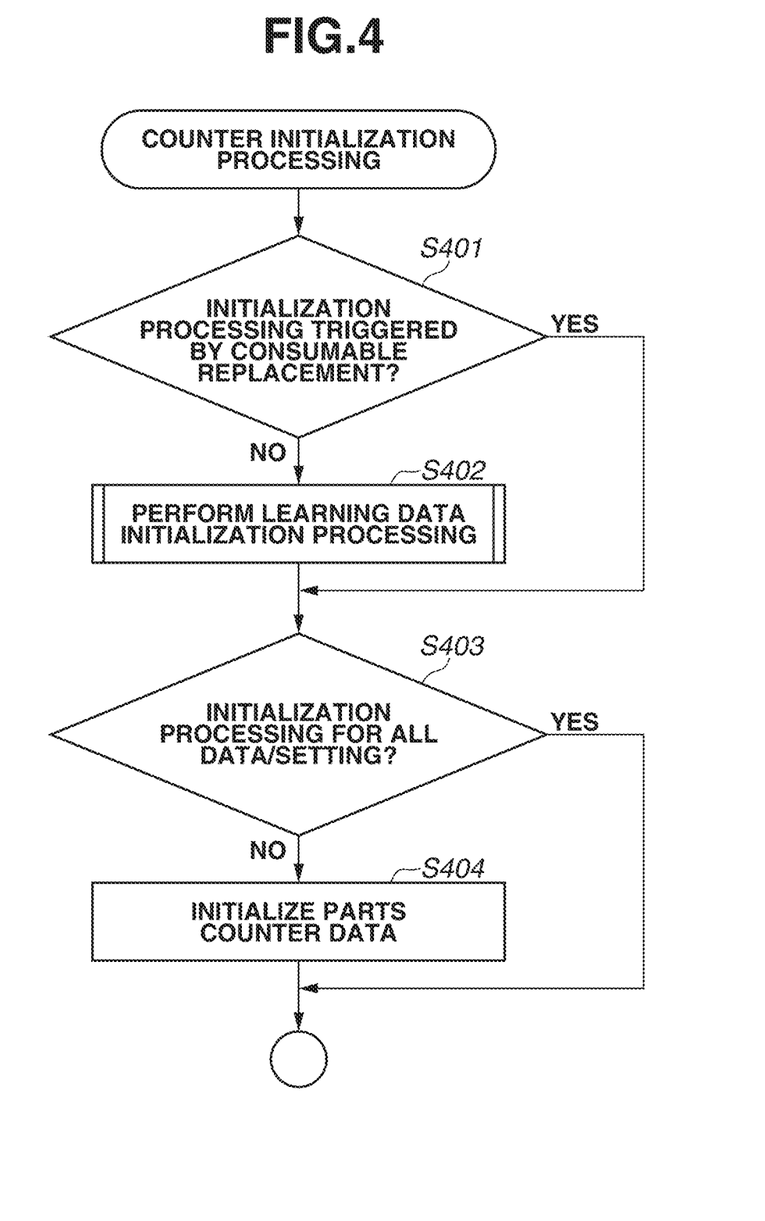
FIG. 4 is a flowchart illustrating counter initialization processing.

The CPU 101 reads out a program for implementing each control module stored in the ROM 102 or the storage 111 into the RAM 104 and executes the read-out program, so that each operation (step) illustrated in the flowchart in FIG. 4 is implemented.

In step S401, the controller 130 changes the processing by determining whether the initialization processing in this flow is triggered by the consumable replacement.

The present exemplary embodiment is about the initialization processing triggered by the consumable replacement (YES in step S401). Therefore, the processing proceeds to step S403, without execution of the initialization processing for the learning data by the controller 130 in step S402. The processing in step S402 will be described below in a third exemplary embodiment.

In step S403, the controller 130 changes the processing by determining whether the trigger of the initialization processing in this flow is initialization processing for all data/setting. The initialization processing for all data/setting refers to initialization processing for various settings of the image forming apparatus and user data such as registration information and application data, in a case where, for example, the image forming apparatus is scrapped or the image forming apparatus that has been rented is returned (recycled). If the trigger is the initialization processing for all data/setting (YES in step S403), this flow ends.

In step S404, the controller 130 initializes the parts counter data.

In step S304, the controller 130 displays the result of the counter initialization processing completed in step S303, on the operation unit 113.

As described above, in the present exemplary embodiment, only the parts counter data is initialized by the automatic initialization processing triggered by the consumable replacement, and the learning data can be continuously used. Therefore, the lifespan can be displayed in a manner suitable for the way the image forming apparatus is used by a customer, after the consumable replacement as well.

In the first exemplary embodiment, the automatic initialization for the consumable that allows the automatic replacement detection is described. In the second exemplary embodiment, the manual initialization by the user will be described. The photosensitive drum is an example of the consumable not allowing the automatic replacement detection, and is a consumable not easily replaced by the user or less frequently replaced. In general, for such a consumable, an automatic replacement detection sensor is not provided, and a service engineer manually performs the initialization after consumable replacement.

Operation for the manual initialization processing in consumable replacement in the image forming apparatus 100 will be described with reference to a flowchart in FIG. 5.

Figure 5:
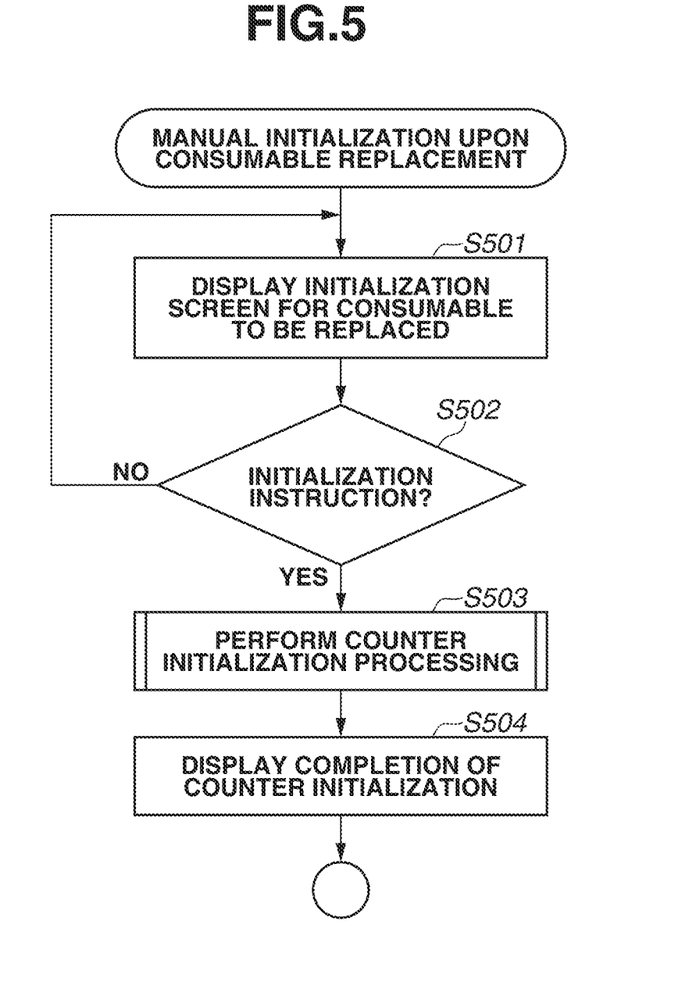
FIG. 5 is a flowchart illustrating manual initialization in consumable replacement according to a second exemplary embodiment.

The CPU 101 in the controller 130 reads out a program for implementing each control module stored in the ROM 102 or the storage 111 into the RAM 104 and executes the read-out program, so that each operation (step) illustrated in the flowchart in FIG. 5 is implemented. In the present exemplary embodiment, an example in which the controller 130 directly controls each consumable will be described. However, for example, the printer 106 and the scanner 108 may also communicate with the controller 130, as a printer controller and a scanner controller each having a configuration including a CPU, a ROM, and a RAM likewise.

Figure 6A:
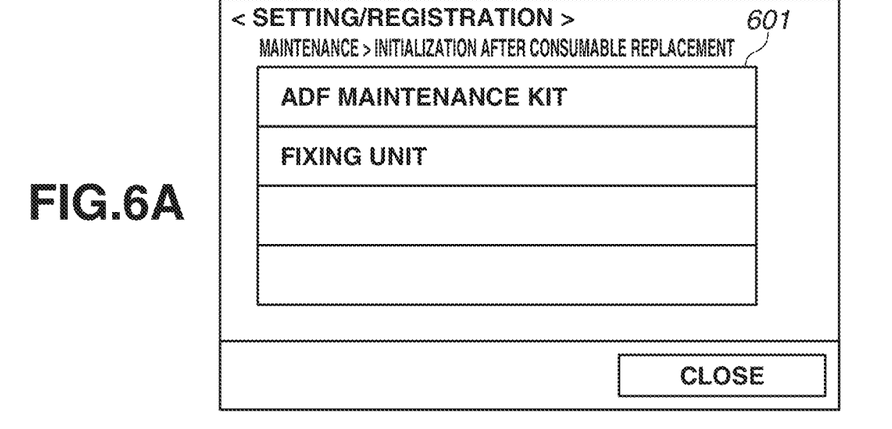
FIGS. 6A, 6B, and 6C illustrate an example of a screen on an operation unit in manual initialization by a user in consumable replacement according to the second exemplary embodiment.
Figure 6B:
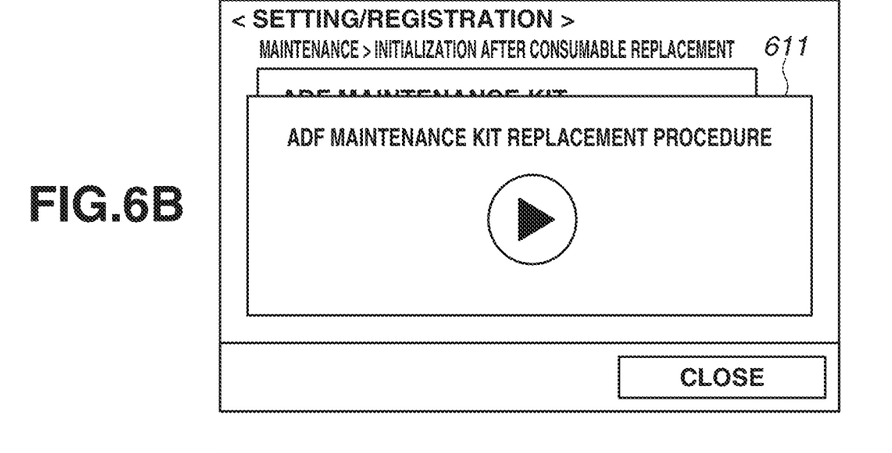
Figure 6C:
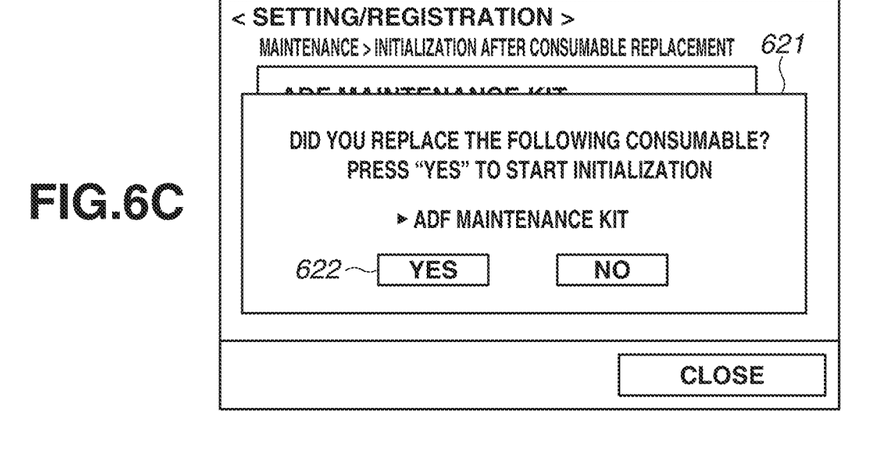

In step S501, the controller 130 displays an initialization screen for a consumable to be replaced, on the operation unit 113. FIGS. 6A, 6B, and 6C as well as FIGS. 7A and 7B illustrate an example of the initialization screen displayed by the operation unit 113.

FIGS. 6A to 6C illustrate an example of a user mode screen before an initialization instruction for a consumable replaceable by the user is provided. In the present exemplary embodiment, an example of presenting information indicating that an ADF maintenance kit and a fixing unit are replaceable as illustrated in FIG. 6A will be described. When an ADF maintenance kit 601 is selected on the operation unit 113, a transition to a screen in FIG. 6B occurs, so that a window 611 that displays a specific replacement procedure appears. Afterward, a transition to a screen in FIG. 6C occurs, so that a window 621 that waits for an initialization instruction for the ADF maintenance kit appears (step S502). When a "yes" button 622 is selected in this window, the initialization processing for the ADF maintenance kit begins (step S503).

Figure 7A:
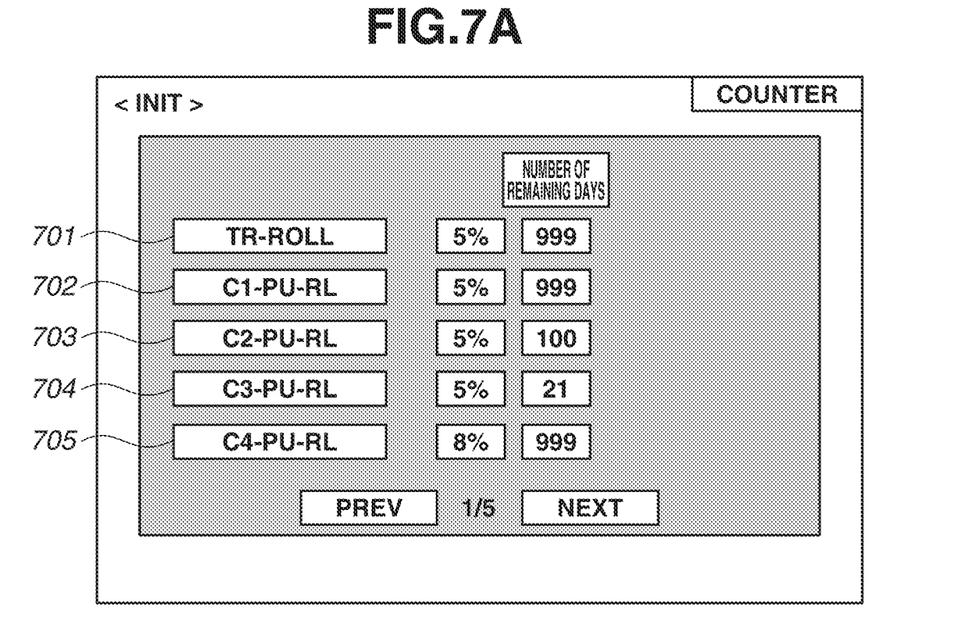
FIGS. 7A and 7B each illustrate an example of a screen on the operation unit in manual initialization by a service engineer in consumable replacement according to the second exemplary embodiment.
Figure 7B:
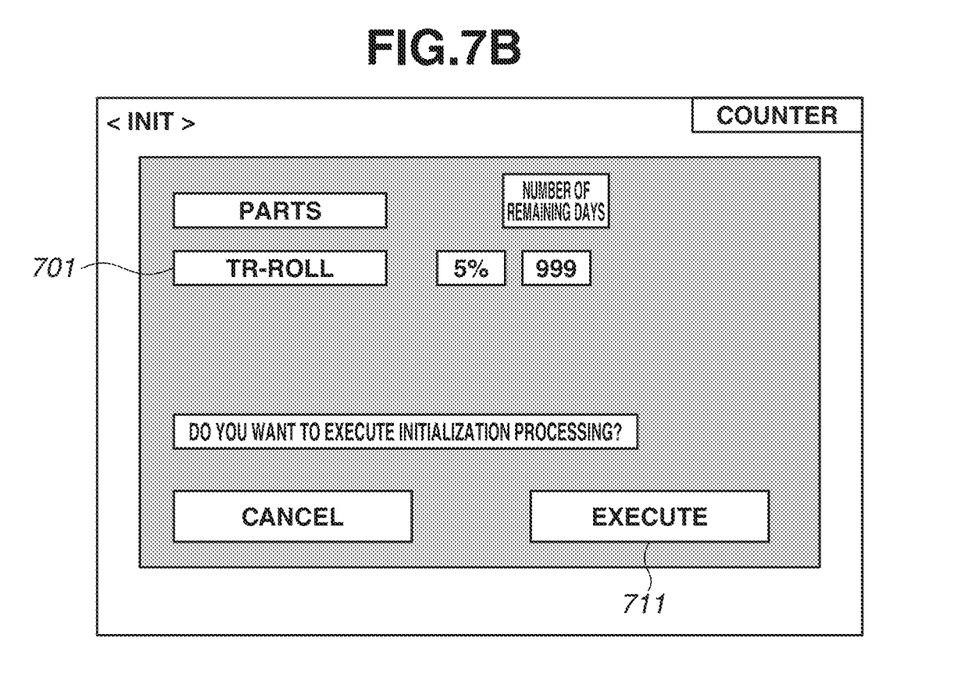

FIGS. 7A and 7B each illustrate an example of a screen before receiving an initialization instruction provided by a professional service engineer entrusted by the user with maintenance and operation of the image forming apparatus because it is difficult for the user to replace a consumable. In a screen in FIG. 7A, a TR-ROLL 701, a C1-PU-RL 702, a C2-PU-RL 703, a C3-PU-RL 704, and a C4-PU-RL 705 represent a transfer roller and first to fourth cassette feeding rollers (from a cassette 1 to a cassette 4), respectively. For example, when the TR-ROLL 701 is selected, a screen in FIG. 7B that waits for an initialization instruction for the transfer roller appears (step S502). When an "execute" button 711 is pressed, the initialization processing is executed (step S503).

In step S502, the controller 130 displays the initialization screen until the controller 130 receives the initialization instruction (the press of the "yes" button 622 or the "execute" button 711) from the operation unit 113, and determines whether the initialization instruction is received. If the initialization instruction is received from the operation unit 113 (YES in step S502), the processing proceeds to step S503. In step S503, the controller 130 executes the counter initialization processing. Step S503 is similar to step S303 described in the first exemplary embodiment and thus will not be described.

Figure 12:
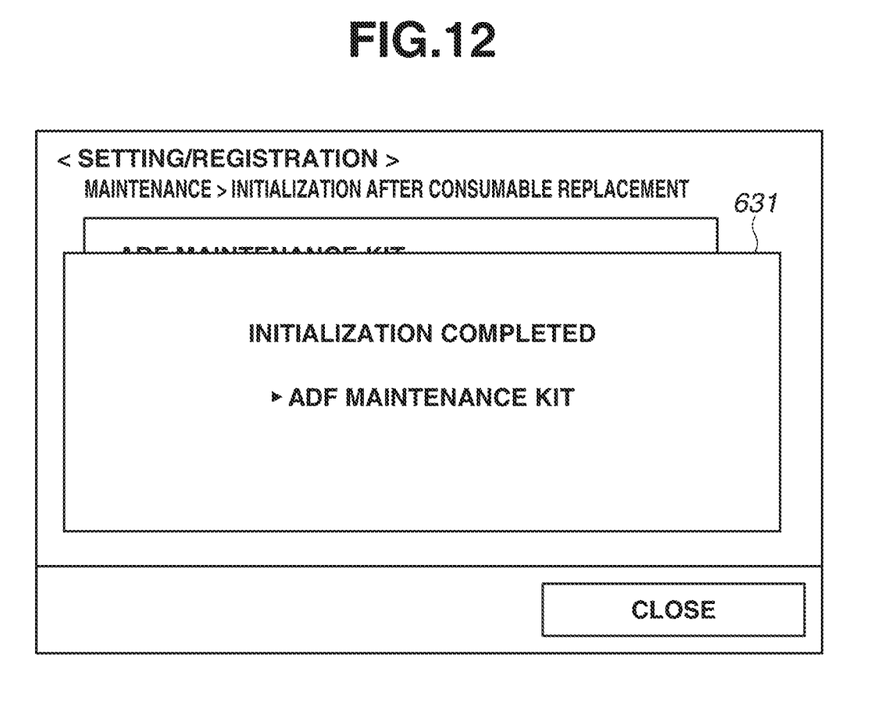
FIG. 12 illustrates an example of a screen on the operation unit in the manual initialization by the user in the consumable replacement according to the second exemplary embodiment.

In step S504, the controller 130 displays the result of the completed counter initialization, on the operation unit 113. FIG. 12 illustrates an example of a screen for displaying the result. In FIG. 12, the completion of the initialization processing for the ADF maintenance kit that had been the target of the initialization instruction is displayed on the operation unit 113 (a window 631).

As described above, in the present exemplary embodiment, only the parts counter data is initialized by the manual initialization processing triggered by the consumable replacement, and the learning data can be continuously used. Therefore, the lifespan can be displayed in a manner suitable for the way the image forming apparatus is used by a customer, after the consumable replacement as well.

In the third exemplary embodiment, initialization in a case where consumable replacement is not performed (hereinafter referred to as the initialization for all data/setting), such as recycling of the image forming apparatus, will be described.

In the initialization processing in the case where the consumable replacement is not executed, which is performed when the rental of the image forming apparatus ends and the image forming apparatus is returned (recycled), the consumption information is not initialized. Therefore, there is a possibility that an order is automatically placed based on the usage of the former user, in a case where the user is changed and the image forming apparatus is reactivated.

Because the consumable replacement is not performed, the parts counter data is not initialized. However, if the learning data is not initialized while the user and the country for use are changed, automatic delivery occurs based on the usage of the former user, leading to early delivery or delayed delivery.

Figure 8:
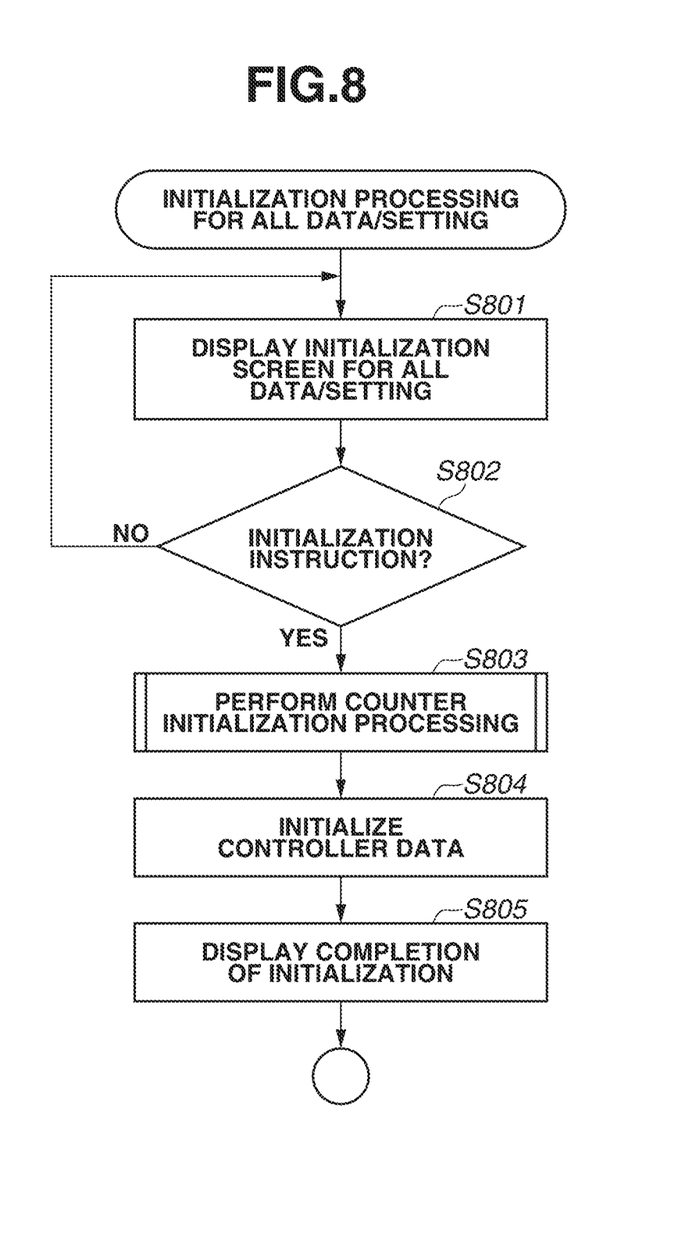
FIG. 8 is a flowchart illustrating initialization processing for all data/setting according to a third exemplary embodiment.

Operation of the initialization processing for all data/ setting in the image forming apparatus 100 will be described with reference to a flowchart in FIG. 8. The CPU 101 in the controller 130 reads out a program for implementing each control module stored in the ROM 102 or the storage 111 into the RAM 104 and executes the read-out program, so that each operation (step) illustrated in the flowchart in FIG. 8 is implemented. In the present exemplary embodiment, an example in which the controller 130 directly controls each consumable will be described. However, for example, the printer 106 and the scanner 108 may also communicate with the controller 130, as a printer controller and a scanner controller each having a configuration including a CPU, a ROM, and a RAM likewise.

Figure 9:
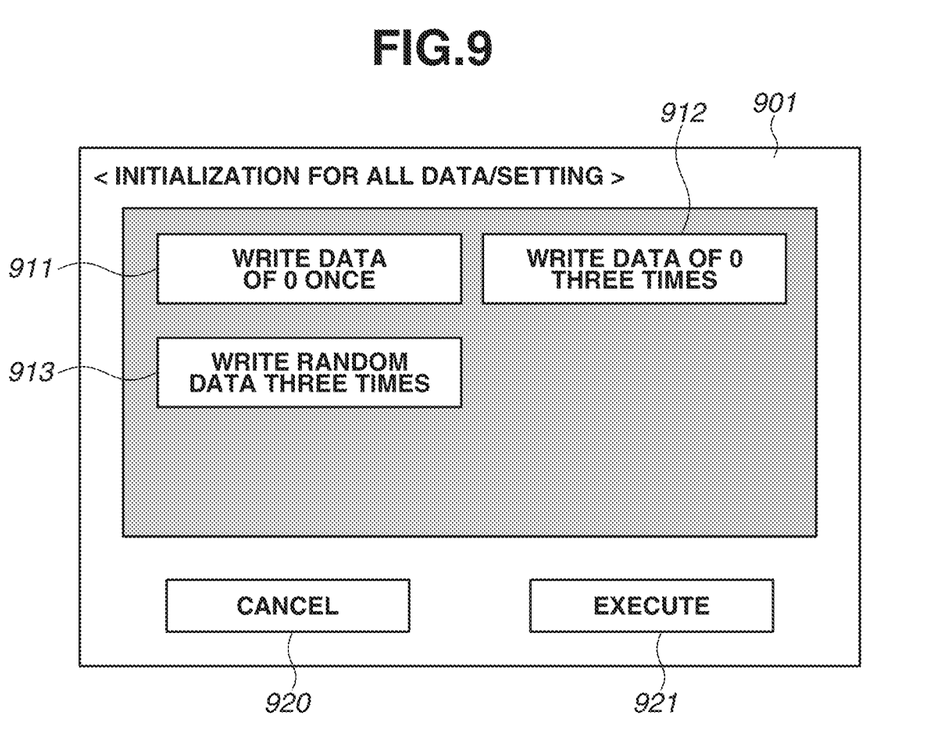
FIG. 9 illustrates an example of a screen on the operation unit in the initialization processing for all data/setting according to the third exemplary embodiment.

In step S801, the controller 130 displays an initialization screen for all data/setting, on the operation unit 113. FIG. 9 illustrates an example of the screen displayed on the operation unit 113.

A screen 901 displays types of overwriting data in the initialization. A button 911 indicates setting of overwriting with data of 0 once, a button 912 indicates setting of overwriting with data of 0 three times, and a button 913 indicates setting of overwriting with data of a random value three times. Besides, there is a case where a button such a setting button for overwriting in the form of Department of Defense (DoD) standard of the United States Department of Defense is displayed, but such a button is omitted here. The initialization is started by pressing an "execute" button 921, whereas the initialization of setting information is canceled by pressing a "cancel" button 920.

In step S802, the controller 130 displays the initialization screen until receipt of an initialization instruction (the press of the button 911, 912, or 913) from the operation unit 113, and determines whether the initialization instruction is received from the operation unit 113. If the initialization instruction is received from the operation unit 113 (YES in step S802), the processing proceeds to step S803 to execute the counter initialization processing.

In step S803, the controller 130 performs the counter initialization processing. The details of the counter initialization processing are described with reference to the flowchart in FIG. 4 in the first exemplary embodiment. In the present exemplary embodiment, the description will focus on steps each having a point different from the first exemplary embodiment.

The CPU 101 reads out a program for implementing each control module stored in the ROM 102 or the storage 111 into the RAM 104 and executes the read-out program, so that each operation (step) illustrated in the flowchart in FIG. 4 is implemented.

In step S401, the controller 130 changes the processing by determining whether the initialization processing in this flow is triggered by the consumable replacement.

The present exemplary embodiment is about the initialization processing for all data/setting (NO in step S401). Therefore, the processing proceeds to step S402. In step S402, the controller 130 performs the initialization processing for the learning data. This initialization processing will be described in detail with reference to a flowchart in FIG. 10.

Figure 10:
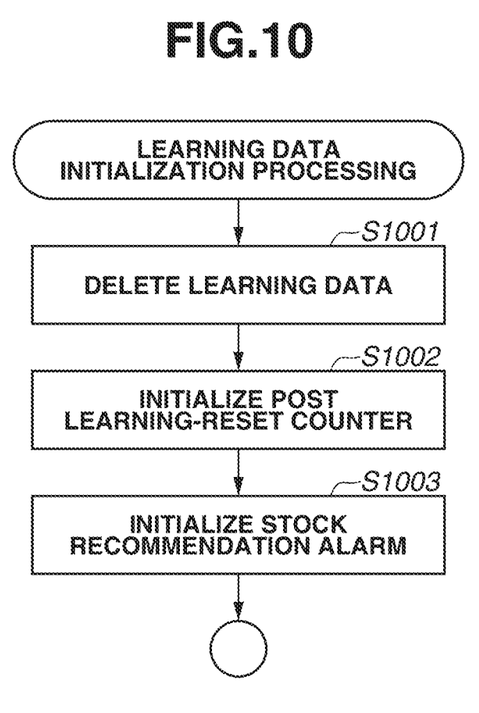
FIG. 10 is a flowchart illustrating learning data initialization processing according to the third exemplary embodiment.

The CPU 101 reads out a program for implementing each control module stored in the ROM 102 or the storage 111 into the RAM 104 and executes the read-out program, so that each operation (step) illustrated in the flowchart in FIG. 10 is implemented.

In step S1001, the controller 130 deletes the learning data for all consumables.

In step S1002, the controller 130 initializes the post learning-reset counter. The post learning-reset counter is a counter that does not predict the lifespan until the value is incremented to a predetermined threshold, i.e., the post learning-reset counter is a counter indicating a state where learning continues. Immediately after the start of the operation of the image forming apparatus, the feature of the usage of the user is insufficient. Therefore, the number of remaining days that is a specific result of lifespan prediction is displayed when the value exceeds the threshold.

In step S1003, the controller 130 initializes the stock recommendation alarm and ends this flow.

Step S1001 to step S1003 deletes the usage of the former user. Therefore, after executing the initialization processing for all data/setting, the image forming apparatus can start from a stage of learning the usage of a user again when the image forming apparatus is reactivated.

In step S403, the controller 130 changes the processing by determining whether the trigger for the initialization processing in this flow is the initialization processing for all data/setting.

Because the present exemplary embodiment is about the initialization processing for all data/setting (YES in step S403), the controller 130 does not perform the initialization processing for the parts counter data in step S403 and this flow ends.

In step S804, the controller 130 initializes the data stored in the RAM 104 and the storage 111 of the image forming apparatus 100. In a case where the parts counter data and the learning data are stored in the RAM 104 and the storage 111, other data is initialized.

In step S805, the controller 130 displays a screen indicating that the initialization for all data/setting is completed, on the operation unit 113.

As described above, because the initialization that deletes the learning data while holding the parts counter data is performed, learning can be started at the time of next activation, so that automatic delivery based on the usage of the former user is prevented.

According to the exemplary embodiments of the present disclosure, the learning data is not initialized when the consumable is replaced, so that the lifespan of the consumable can be predicted with high accuracy after the consumable replacement as well.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)TM), a flash memory device, a memory card, and the like. While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-007006, filed Jan. 18, 2019, which is hereby incorporated by reference herein in its entirety.

What is claimed is:

1. An image forming apparatus comprising:
a detection unit configured to detect a consumable used for image formation in the image forming apparatus needs to be replaced; and
an initialization unit configured to initialize counter data of a number of printed sheets using the consumable in response to the replacement of the consumable detected by the detection unit, the initialization of counter data occurring without initializing learning data for determining a remaining use period from a use amount in a predetermined period of the consumable.

2. The image forming apparatus according to claim 1, wherein the counter data includes at least one of a print sheet counter and a number of replacements of the consumable.

3. The image forming apparatus according to claim 1, further comprising a notification unit configured to notify a user of a remaining use period of the consumable predicted from the counter data and the learning data.

4. The image forming apparatus according to claim 1, wherein the learning data includes an average and a standard deviation of consumption of the consumable in a predetermined period.

5. The image forming apparatus according to claim 1, wherein initialization of the counter data and the learning data causes the counter data and the learning data to be deleted.

6. An image forming apparatus comprising:
- a reception unit configured to receive an instruction for initialization of information stored in a memory in the image forming apparatus; and
- an initialization unit configured to initialize learning data for determining a remaining use period from a use amount in a predetermined period of a consumable based on receipt of the instruction for initialization, the initialization of the learning data occurring without initializing counter data of the consumable to be used in image formation in the image forming apparatus.

7. A control method for an image forming apparatus, the control method comprising:
- detecting a consumable used for image formation in the image forming apparatus needs to be replaced; and
- initializing counter data of a number of printed sheets using the consumable in response to the detected replacement of the consumable, the initialization of counter data occurring without initializing learning data for determining a remaining use period from a use amount in a predetermined period of the consumable.

8. The control method according to claim 7, wherein the counter data of the consumable includes at least one of a print sheet counter and a number of replacements of the consumable.

9. The control method according to claim 7, further comprising a notification unit configured to notify a user of a remaining use period of the consumable predicted from the counter data and the learning data.

10. The control method according to claim 7, wherein the learning data includes an average and a standard deviation of consumption of the consumable in a predetermined period.

11. A control method for an image forming apparatus, the control method comprising:
- receiving an instruction for initialization of information stored in a memory in the image forming apparatus; and
- initializing learning data for determining a remaining use period from a use amount in a predetermined period of a consumable, without initializing counter data of the consumable to be used in image formation in the image forming apparatus, based on reception of the instruction for initialization.

12. An image forming apparatus having a replaceable consumable, the image forming apparatus comprising:
- a storage unit configured to store, for the consumable, a number of printed sheets using the consumable, and learning data for determining a remaining use period from a use amount in a predetermined period of the consumable;
- a detection unit configured to detect that the consumable needs to be replaced; and
- an initialization unit configured to initialize the number of printed sheets, without initializing the learning data, in response to detecting that the consumable needs to be replaced.

13. The image forming apparatus according to claim 12, wherein the consumable is a toner container filled with a recording material.

14. The image forming apparatus according to claim 12, further comprising a notification unit configured to notify a user of a remaining use period of the consumable predicted from the learning data.

15. The image forming apparatus according to claim 12, wherein the learning data includes an average and a standard deviation of consumption of the consumable in a predetermined period.

16. The image forming apparatus according to claim 12, wherein initialization of the learning data is deletion of the learning data.

17. The image forming apparatus according to claim 12, wherein the initialization unit further initializes a number of replacements of the consumable.

* * * * *